United States Patent [19]

Guntersdorfer

[11] 3,975,594

[45] Aug. 17, 1976

[54] APPARATUS UTILIZING A PHANTOM CIRCUIT FOR CONNECTING ADDITIONAL SUBSCRIBERS TO A TELECOMMUNICATION SYSTEM

[75] Inventor: Siegfried Guntersdorfer, Sauerlach, Germany

[73] Assignee: Siemens Aktiengesellschaft, Berlin & Munich, Germany

[22] Filed: Feb. 10, 1975

[21] Appl. No.: 548,671

Related U.S. Application Data

[63] Continuation of Ser. No. 316,588, Dec. 19, 1972, abandoned.

[30] Foreign Application Priority Data

Dec. 20, 1971 Germany.................... 2163284

[52] U.S. Cl........................... 179/15 BB; 179/2 TV
[51] Int. Cl.²................... H04M 7/08; H04M 11/08
[58] Field of Search................ 179/2.5 R, 15 BB, 4, 179/2 TV, 170 J

[56] References Cited

UNITED STATES PATENTS

| 706,318 | 8/1902 | Howell | 179/15 BB |
| 1,374,221 | 4/1921 | Osborne | 179/15 BB |
| 2,089,179 | 8/1937 | Black | 179/170 J |
| 2,208,417 | 7/1940 | Gilbert | 179/170 J |
| 2,347,505 | 4/1944 | Rhoads | 179/15 BB |

FOREIGN PATENTS OR APPLICATIONS 2,163,284  6/1973  Germany

OTHER PUBLICATIONS

Glossary of Communications, E. C. Smith c. 1971 p. 357 copy in AU232 Telephony Publishing, Corp. 53 West Jackson Blvd. Chicago, Ill., 60604.

*Primary Examiner*—George G. Stellar

[57] ABSTRACT

A subscriber line circuit for telecommunication systems in which additional message signals, e.g., video signals, can be transmitted is described. The line circuit is constituted by two balanced line pairs which, if necessary, can have line amplifiers interposed therein. A remote supply circuit for the amplifiers, constructed in the form of a phantom circuit, is used, and this phantom circuit is used, as well, as the transmission circuit for the additional message signals. A subscriber set for the additional message signals is connected to the phantom circuit. A feed to the latter subscriber set, as well as two way communication take place over the phantom circuit.

1 Claim, 1 Drawing Figure

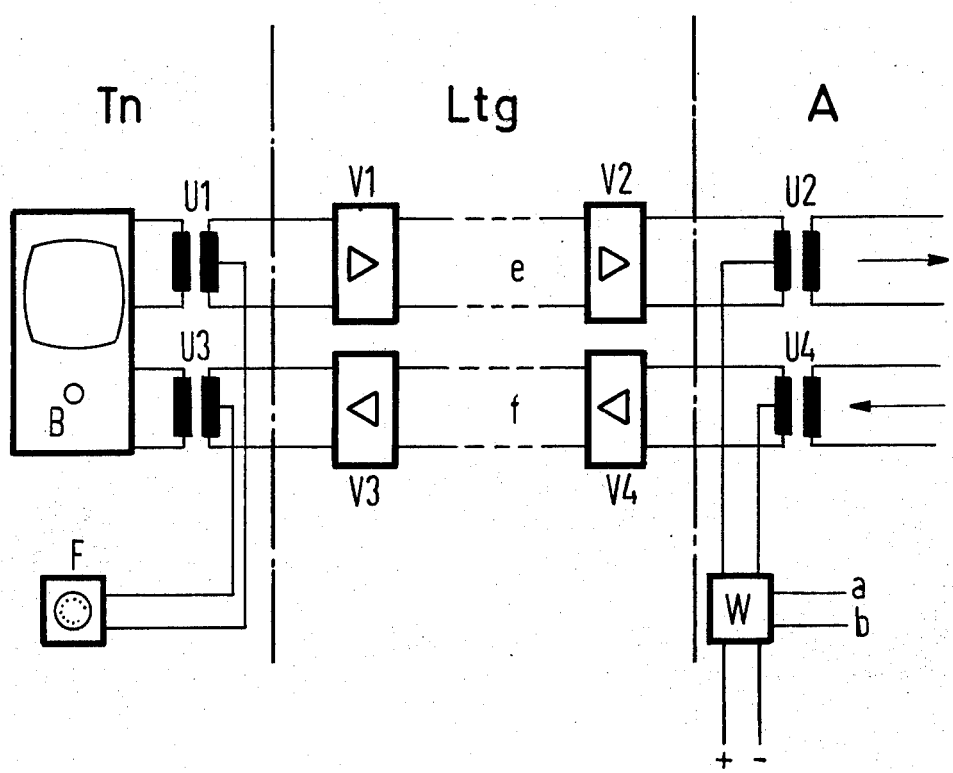

APPARATUS UTILIZING A PHANTOM CIRCUIT FOR CONNECTING ADDITIONAL SUBSCRIBERS TO A TELECOMMUNICATION SYSTEM

This is a continuation of application Ser. No. 316,588, filed Dec. 19, 1972 now abandoned.

BACKGROUND OF THE INVENTION

This invention relates to a circuit arrangement for subscriber lines using two symmetrical line pairs for additional message in a telecommunication system. The invention has been found to be particularly useful in video telephone applications.

As is known, line amplifiers in transmission lines may be remotely supplied in series for additional character transmission or the like. The remote-supply circuit is generally constructed as a phantom circuit of the two line pairs.

The remote supply to intermediate amplifiers may be constructed, for example, as described in the article "Baseband Video Transmission on Loops and Short-Haul Trunk," Bell System Technical Journal, February 1971, pages 395 through 425. If comparatively long subscriber lines are employed, it is necessary to insert frequency-correcting intermediate amplifiers into the symmetrical line pairs over which the video information is transmitted. To avoid the need for additional conductors for feeding the amplifiers, a direct-current source is connected as a phantom circuit to both line pairs such that first the amplifiers of one line pair and subsequently, those of the other line pair are fed simultaneously with the required portion of the applied voltage on the return path.

In addition to the two symmetrical line pairs for directional message transmission, hereinafter referred to as video transmission but not restricted thereto, a further circuit for the telephone set is required for such a subscriber line. Thus, a total of six wires is required.

An object of this invention is to provide a line construction which will permit the number of required lines to be reduced in such circuits.

SUMMARY OF THE INVENTION

The invention solves the above and other problems by additionally connecting the additional subscriber set for the additional message, e.g., telephone set, of the subscriber station to the phantom circuit employed for the remote supply to the line amplifiers. In this arrangement, both the feed to the telephone set and the two-way voice transmission take place over the phantom circuit.

The invention has the advantage that, for example, the line pairs required for the voice transmission and the feed to the telephone set can be dispensed with, i.e., one-third of the normally required wires can be eliminated. This arrangement will necessitate only a small additional cost in existing line using intermediate amplifiers.

The invention can equally be used for subscriber lines without intermediate amplifiers, wherein the same feeding apparatus is used and the coupling of the direct-current voltages and voice-frequency voltages take place in the same manner as in lines using intermediate amplifiers.

BRIEF DESCRIPTION OF THE DRAWINGS

A preferred embodiment of the invention will be described in detail hereinbelow with reference to the single FIGURE accompanying drawing which is a schematic view of the preferred embodiment.

DETAILED DESCRIPTION OF THE DRAWINGS

A subscriber station having a video telephone B in addition to an audio telephone set F is connected to an exchange switching center A over two symmetrical or balanced line pairs Ltg.

The two line pairs $e$ and $f$ transmit the message data, in this case video data, in one direction each, line $e$ from subscriber Tn to exchange A and line $f$ in the opposite direction. A number of intermediate amplifiers are inserted into both line pairs, of which only amplifiers V1 and V2 are illustrated in line $e$ and amplifiers V3 and V4 in line $f$.

The two line pairs Ltg terminate at their ends in a transformer, one transformer being connected across each line pair. The transformers U1 and U3 are in the subscriber station Tn, and transformers U2 and U4 are located in the exchange A. Each of these transformers has a central tap on the line side, so that at these taps, an additional phantom circuit can be constructed in the known manner. The transformers U1 through U4 are illustrated in the conventional manner. However, they may also be constructed as electronic circuits.

An additional subscriber set, in this case set F, is connected to the subscriber station Tn to the two central taps of the transformers U1 and U3. Similarly, a branch circuit W in exchange A is connected to the two central taps of the transformers U2 and U4. This branch circuit, which can be a conventional preselector circuit, serves to prepare the supply voltage for feeding the phantom circuit, which must have a corresponding level in dependence on the number of amplifiers. Also, the voice frequencies and all other telephone signals or control signals, e.g., dial signals, dial tones, ring-forward signals, closed loop, charge registration, etc., are coupled and, perhaps, attenuated in this branch circuit.

A supply current is coupled in the known manner from said branch circuit to the line pairs $e$ and $f$. In the process, a voltage drop is produced in the amplifiers V1 through V4, which voltage drop is sufficient to operate the amplifiers. In like manner, a voltage is generated in the telephone set F which produces sufficient current to feed the transmitter. So as not to extensively attenuate the voice frequencies of the voice circuit in the amplifiers V1 through V4, corresponding bypass circuits, e.g., capacitors, are provided therein for these frequencies. The other devices for filtering out the supply current in the amplifiers are old in the art and are, therefore, not described herein.

If shorter subscriber lines are used, which do not require amplifiers, the telephone set F is connected in like manner to the phantom circuit. However, the supply voltage in the branch circuit must be adjusted such that the required voltage of the telephone set F is not exceeded.

It is also possible to modify the circuit arrangement in accordance with the invention in a manner such that, over the phantom circuit described hereinabove, only the transmission of various telephone signals, such as closed loop, dial and call, takes place, in addition to coupling signals to the telephone set. However, the dial tones and the voice frequency are modulated in the known manner into the video signal or into the blanking intervals thereof, so that these signals, together with the video signal, are carried on a four-wire basis and amplified in the amplifiers V1 through V4.

The exemplary embodiment described hereinabove is provided to enable an understanding of the principles of this invention only, and it is contemplated that any equivalent structure will be within the scope of the invention, as defined by the appended claims.

I claim:

1. In telecommunication systems wherein line connections from a subscriber set to an exchange switching center are made over two balanced line pairs which additionally form a phantom circuit providing a path for a remote power source, the improvement comprising:

additional subscriber set means connected to said phantom circuit at the location of said subscriber set so that a two-way message path is formed between said additional subscriber set and said exchange switching center over said phantom circuit and a conducting path is formed between said remote power source and said additional subscriber set and branch circuit means connected to said phantom circuit and including said remote power source, means for coupling audio signals to said phantom circuit and means for coupling control signals to said phantom circuit.

* * * * *